(12) United States Patent
Stanek et al.

(10) Patent No.: US 9,114,709 B2
(45) Date of Patent: Aug. 25, 2015

(54) LIMITED OPERATING STRATEGY FOR AN ELECTRIC VEHICLE

(75) Inventors: Joseph F. Stanek, Northville, MI (US); William David Treharne, Ypsilanti, MI (US); Ryan J. Skaff, Farmington Hills, MI (US); Christopher Adam Ochocinski, Canton, MI (US); Dale Gilman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 661 days.

(21) Appl. No.: 13/404,108

(22) Filed: Feb. 24, 2012

(65) Prior Publication Data

US 2013/0221741 A1 Aug. 29, 2013

(51) Int. Cl.
*B60L 1/00* (2006.01)
*B60L 3/00* (2006.01)
(Continued)

(52) U.S. Cl.
CPC . *B60L 1/003* (2013.01); *B60L 1/02* (2013.01); *B60L 3/0046* (2013.01); *B60L 3/04* (2013.01); *B60L 7/14* (2013.01); *B60L 11/005* (2013.01); *B60L 11/1803* (2013.01); *B60L 11/1816* (2013.01); *B60L 11/1859* (2013.01); *B60L 11/1862* (2013.01); *B60L 11/1868* (2013.01); *B60L 11/1887* (2013.01); *B60L 15/2009* (2013.01); *H02J 7/0047* (2013.01); *H02J 7/0054* (2013.01); *H02J 7/0055* (2013.01); *H02J 7/02* (2013.01); *H02J 7/14* (2013.01); *B60L 2210/30* (2013.01); *B60L 2210/40* (2013.01); *B60L 2240/12* (2013.01); *B60L 2240/34* (2013.01); *B60L 2240/421* (2013.01); *B60L 2240/545* (2013.01); *B60L 2240/547* (2013.01); *B60L 2240/549* (2013.01); *B60L 2250/10* (2013.01); *B60L 2250/12* (2013.01); *B60L 2250/16* (2013.01); *H02J 2007/005* (2013.01); *H02J 2007/0067* (2013.01); *Y02T 10/642* (2013.01); *Y02T 10/7005* (2013.01); *Y02T 10/7022* (2013.01); *Y02T 10/7044* (2013.01); *Y02T 10/7066* (2013.01); *Y02T 10/7241* (2013.01); *Y02T 10/7275* (2013.01); *Y02T 90/127* (2013.01); *Y02T 90/14* (2013.01); *Y02T 90/34* (2013.01)

(58) Field of Classification Search
USPC .......................................... 307/9.1
See application file for complete search history.

(56) References Cited

U.S. PATENT DOCUMENTS 5,227,703 A 7/1993 Boothe et al.
5,291,960 A 3/1994 Brandenburg et al.
(Continued)

OTHER PUBLICATIONS

Office Action dated Nov. 22, 2013 from corresponding U.S. Appl. No. 13/404,101, filed on Feb. 24, 2012, 22 pp.
(Continued)

*Primary Examiner* — Rexford Barnie
*Assistant Examiner* — Dru Parries
(74) *Attorney, Agent, or Firm* — David B. Kelley; Brooks Kushman PC

(57) ABSTRACT

A vehicle is provided with a climate control system and a battery that is connected to the climate control system for supplying power. The vehicle also includes at least one controller that is configured to receive input indicative of a battery power limit and a battery state of charge (BSOC). The at least one controller is also configured to disable the climate control system and reduce the battery power limit to an intermediate power limit, when the BSOC is less than a discharge limit.

18 Claims, 8 Drawing Sheets

(51) Int. Cl.
*B60L 1/02* (2006.01)
*B60L 3/04* (2006.01)
*B60L 7/14* (2006.01)
*B60L 11/00* (2006.01)
*B60L 11/18* (2006.01)
*B60L 15/20* (2006.01)
*H02J 7/00* (2006.01)
*H02J 7/02* (2006.01)
*H02J 7/14* (2006.01)

(56) References Cited

U.S. PATENT DOCUMENTS

| | | | |
|---|---|---|---|
| 5,726,541 A | 3/1998 | Glenn et al. | |
| 6,026,921 A | 2/2000 | Aoyama et al. | |
| 6,242,873 B1 | 6/2001 | Drozdz et al. | |
| 6,763,298 B2 | 7/2004 | Boggs et al. | |
| 6,882,913 B2 | 4/2005 | Bullister et al. | |
| 6,885,920 B2 | 4/2005 | Yakes et al. | |
| 7,073,615 B2 | 7/2006 | Mack | |
| 7,184,866 B2 | 2/2007 | Squires et al. | |
| 7,254,468 B2 | 8/2007 | Pillar et al. | |
| 7,275,610 B2 | 10/2007 | Kuang et al. | |
| 7,302,320 B2 | 11/2007 | Nasr et al. | |
| 7,689,332 B2 | 3/2010 | Yakes et al. | |
| 7,711,460 B2 | 5/2010 | Yakes et al. | |
| 8,004,234 B2 | 8/2011 | Walrath | |
| 8,125,099 B2 * | 2/2012 | Flick | 307/9.1 |
| 8,138,720 B2 | 3/2012 | Snyder et al. | |
| 2004/0148075 A1 | 7/2004 | Bullister et al. | |
| 2006/0058932 A1 | 3/2006 | Garg et al. | |
| 2006/0186738 A1 | 8/2006 | Noguchi et al. | |
| 2009/0184686 A1 | 7/2009 | Owens et al. | |
| 2009/0259356 A1 | 10/2009 | Clark et al. | |
| 2010/0065361 A1 | 3/2010 | Nam et al. | |
| 2010/0145559 A1 | 6/2010 | Gauthier et al. | |
| 2011/0095765 A1 | 4/2011 | Tae et al. | |
| 2011/0208378 A1 | 8/2011 | Krueger et al. | |
| 2011/0264317 A1 | 10/2011 | Druenert et al. | |
| 2011/0320830 A1 | 12/2011 | Ito | |
| 2013/0241498 A1 | 9/2013 | Koebler | |

OTHER PUBLICATIONS

Office Action dated May 15, 2013 from corresponding U.S. Appl. No. 13/404,101, filed on Feb. 24, 2012, 26 pp.

* cited by examiner

LIMITED OPERATING STRATEGY FOR AN ELECTRIC VEHICLE

TECHNICAL FIELD

One or more embodiments relate to a vehicle system and method for limiting operation of an electric vehicle at low battery power.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

The electric vehicle monitors the status of the battery using a number of measurements, including battery state of charge (BSOC). BSOC is a percentage that represents the amount of energy in the battery from 0% (empty) to 100% (full). Batteries may be damaged if they are overcharged or overly discharged. Therefore, many prior art electric vehicles maintain the battery within an operating range between a charging limit of approximately 80% BSOC and a discharge limit of approximately 20% BSOC.

SUMMARY

In one embodiment, a vehicle is provided with a climate control system and a battery that is connected to the climate control system for supplying power. The vehicle also includes at least one controller that is configured to receive input that is indicative of a battery power limit and a battery state of charge (BSOC). The at least one controller is also configured to disable the climate control system and reduce the battery power limit to an intermediate power limit, when the BSOC is less than a discharge limit.

In another embodiment, a vehicle system is provided with a battery that is configured to supply power to a climate control system. The vehicle system also includes at least one controller that is configured to receive input that is indicative of a battery power limit and a battery state of charge (BSOC). The at least one controller is also configured to disable the climate control system and reduce the battery power limit to an intermediate power limit, when the BSOC is less than a discharge limit and greater than a maximum discharge limit.

In yet another embodiment, a method is provided for limiting operation of an electric vehicle. Input is received that is indicative of a battery power limit, a battery state of charge (BSOC) and a defrost status. The battery power limit is reduced to an intermediate power limit when the BSOC is less than a discharge limit. A climate control system is disabled when the BSOC is less than the discharge limit and the defrost status is inactive.

The disclosed vehicle system provides advantages by allowing limited operation of an electric vehicle below a discharge limit. The vehicle system limits operation of the electric vehicle once the BSOC is less than a discharge limit by disabling climate control systems and reducing a battery power limit to extend a travel range of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
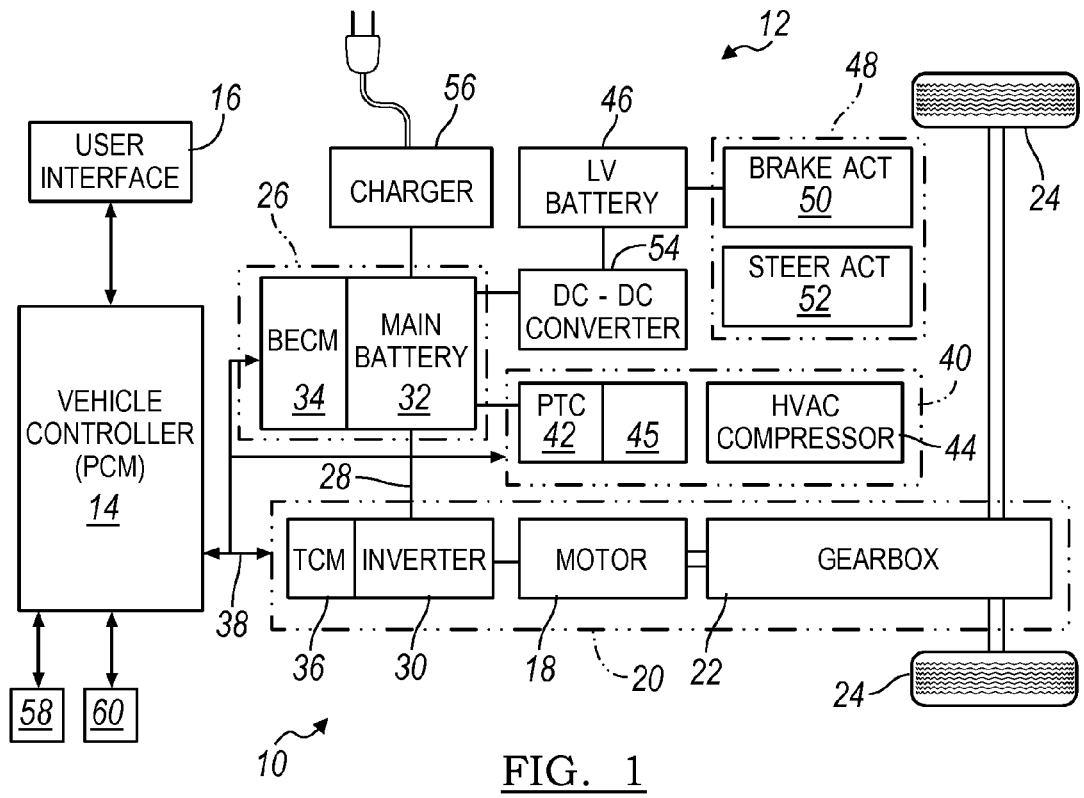
FIG. 1 is a schematic diagram of a vehicle system for limiting operation of an electric vehicle according to one or more embodiments.

With reference to FIG. 1, a vehicle system for controlling the shutdown of an electric vehicle is illustrated in accordance with one or more embodiments and is generally referenced by numeral 10. The vehicle system 10 is depicted within a vehicle 12. The vehicle system 10 includes a vehicle controller 14 and a user interface 16 that are in communication with each other. The vehicle controller 14 receives input signals and limits operation of the vehicle 12 at low battery power. The vehicle controller 14 transmits information to the user interface 16, which in turn conveys the information to the driver in real time. The driver may use this information as a warning, and prepares for limited operation by driving the vehicle 12 to a nearby charging station (not shown).

The illustrated embodiment depicts the vehicle 12 as a battery electric vehicle (BEV), which is an all-electric vehicle propelled by an electric motor 18 without assistance from an internal combustion engine (not shown). The motor 18 receives electrical power and provides drive torque for vehicle propulsion. The motor 18 also functions as a generator for converting mechanical power into electrical power through regenerative braking. The vehicle 12 has a powertrain 20 that includes the motor 18 and a gearbox 22. The gearbox 22 adjusts the drive torque and speed of the motor 18 by a predetermined gear ratio. A pair of half-shafts extend in opposing directions from the gearbox 22 to a pair of driven wheels 24.

Although illustrated and described in the context of a BEV 12, it is understood that embodiments of the present application may be implemented on other types of electric vehicles, such as those powered by an internal combustion engine in addition to one or more electric machines (e.g., hybrid electric vehicles (HEVs), full hybrid electric vehicles (FHEVs) and plug-in electric vehicles (PHEVs), etc.).

The vehicle 12 includes an energy storage system 26 for storing and controlling electrical energy. A high voltage bus 28 electrically connects the motor 18 to the energy storage system 26 through an inverter 30. The energy storage system 26 includes a main battery 32 and a battery energy control module (BECM) 34 according to one or more embodiments. The main battery 32 is a high voltage battery that is capable of outputting electrical power to operate the motor 18. The main battery 32 also receives electrical power from the motor 18, when the motor 18 is operating as a generator during regenerative braking. The inverter 30 converts the direct current (DC) power supplied by the main battery 32 to alternating current (AC) power for operating the motor 18. The inverter 30 also converts alternating current (AC) provided by the motor 18, when acting as a generator, to DC for charging the main battery 32. The main battery 32 is a battery pack made up of several battery modules (not shown), where each battery module contains a plurality of battery cells (not shown). The BECM 34 acts as a controller for the main battery 32. The BECM 34 also includes an electronic monitoring system that manages temperature and state of charge of each of the battery cells. Other embodiments of the vehicle 12 contemplate different types of energy storage systems, such as capacitors and fuel cells (not shown).

The powertrain 20 includes a traction control module (TCM) 36 for controlling the motor 18 and the inverter 30. The TCM 36 monitors, among other things, the position, speed, and power consumption of the motor 18 and provides output signals corresponding to this information to other vehicle systems. The TCM 36 and the inverter 30 convert the direct current (DC) voltage supply by the main battery 32 into alternating current (AC) signals that are used to control the motor 18.

The vehicle controller 14 communicates with other vehicle systems and controllers for coordinating their function. Although it is shown as a single controller, the vehicle controller 14 may include multiple controllers that may be used to control multiple vehicle systems according to an overall vehicle system control (VSC) logic, or software. For example, the vehicle controller 14 may be a powertrain control module (PCM) having a portion of the VSC software embedded therein. The vehicle controller 14 generally includes any number of microprocessors, ASICs, ICs, memory (e.g., FLASH, ROM, RAM, EPROM and/or EEPROM) and software code to co-act with one another to perform a series of operations. The vehicle controller 14 also includes predetermined data, or "look up tables" that are based on calculations and test data and stored within the memory. The vehicle controller 14 communicates with other controllers (e.g., TCM 36, BECM 34) over a hardline vehicle connection 38 using a common bus protocol (e.g., CAN).

Figure 11:
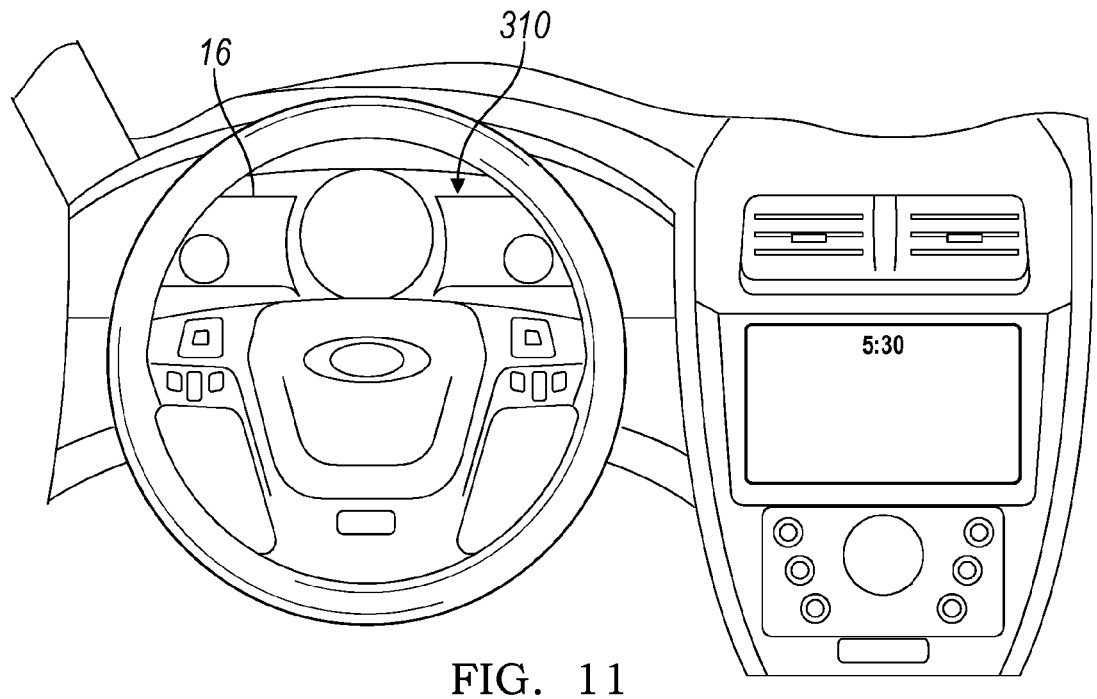
FIG. 11 is a front perspective view of a user interface of the vehicle system of FIG. 1.

The user interface 16 communicates with the vehicle controller 14 for receiving information regarding the vehicle 12 and its surroundings, and conveys this information to the driver. The user interface 16 includes a number of interfaces, such as gauges, indicators, and displays (shown in FIG. 11). The user interface 16 may also include a controller (not shown) for communicating with the vehicle controller 14 and external devices, such as a computer or cellular phone. The vehicle controller 14 provides output to the user interface 16, such as a status of the motor 18 or battery 32, which is conveyed visually to the driver.

The vehicle 12 includes a climate control system 40 for heating and cooling various vehicle components and a passenger compartment (not shown). The climate control system 40 includes a high voltage positive temperature coefficient (PTC) electric heater 42 and a high voltage electric HVAC compressor 44, according to one or more embodiments. The PTC heater 42 and HVAC compressor 44 are used to heat and cool fluid, respectively, that circulates to the powertrain 20 and to the main battery 32. Both the PTC heater 42 and the HVAC compressor 44 may draw electrical energy directly from the main battery 32. The climate control system 40 includes a climate controller 45 for communicating with the vehicle controller 14 over the CAN bus 38. The on/off status of the climate control system 40 is communicated to the vehicle controller 14, and can be based on, for example, the status of an operator actuated switch, or the automatic control of the climate control system 40 based on related functions, such as window defrost. In other embodiments, the climate control system 40 is configured for heating and cooling air (e.g., existing vehicle cabin air) rather than fluid, and circulating the air through the battery 32 and/or powertrain 20.

The vehicle 12 includes a secondary low voltage (LV) battery 46, such as a 12-volt battery, according to one embodiment. The secondary battery 46 may be used to power various vehicle accessories 48 such as an electric braking actuator 50 and an electric steering actuator 52.

A DC-to-DC converter 54 is electrically connected between the main battery 32 and the LV battery 46. The DC-to-DC converter 54 adjusts, or "steps down" the voltage level to allow the main battery 32 to charge the LV battery 46. A low voltage bus electrically connects the DC-to-DC converter 54 to the LV battery 46 and the accessories 48.

The vehicle 12 includes an AC charger 56 for charging the main battery 32. An electrical connector connects the AC charger 56 to an external power supply (not shown) for receiving AC power. The AC charger 56 includes power electronics used to invert, or "rectify" the AC power received from the external power supply to DC power for charging the main battery 32. The AC charger 56 is configured to accommodate one or more conventional voltage sources from the external power supply (e.g., 110 volt, 220 volt, etc.). The external power supply may include a device that harnesses renewable energy, such as a photovoltaic (PV) solar panel, or a wind turbine (not shown).

Also shown in FIG. 1 are simplified schematic representations of a driver controls system 58 and a navigation system 60. The driver controls system 58 includes acceleration, braking, steering and gear selection (shifting) systems (all generally referenced by numeral 58). The acceleration system includes an accelerator pedal having one or more sensors, which provides pedal position information that corresponds to a driver request for drive torque.

The braking system includes a brake pedal, a booster, a master cylinder, as well as mechanical connections to the vehicle wheels, such as the primary driven wheels 24, to effect friction braking. The braking system also includes the electric braking actuator 50 which assists friction braking by adjusting internal pressure within the booster or master cylinder. However, if electrical power to the electric braking actuator 50 were disrupted, then the mechanical connections within the braking system would engage and allow for mechanical (unassisted) friction braking. The braking system also includes position sensors, pressure sensors, or some combination thereof for providing information such brake pedal position that corresponds to a driver request for brake torque.

The braking system also includes a brake controller (not shown) that communicates with the vehicle controller 14 to coordinate regenerative braking and friction braking. The brake controller provides an input signal to the vehicle controller 14 that corresponds to a total brake torque value. The total brake torque value is based on the accelerator pedal position and the brake pedal position. The vehicle controller 14 then compares the total brake torque value to other information to determine a regenerative braking torque value and a friction braking torque value, where the sum of the regenerative braking torque value and the friction braking torque value is approximately equal to the total brake torque value. The vehicle controller 14 provides the regenerative braking torque value to the TCM 36, which in turn controls the motor 18 to provide regenerative braking. The vehicle controller also provides the friction braking torque value to the brake controller, which in turn controls the electric braking actuator 50 to provide friction braking.

In one or more embodiments, the braking system is configured to provide compression braking of the vehicle. Compression braking represents the frictional losses within an engine of a conventional vehicle, when a driver releases the accelerator pedal. Similarly, the braking system provides a total brake torque value when the accelerator pedal is released, even if the brake pedal is not depressed. The vehicle controller 14 then compares the total brake torque value to other information to determine a regenerative braking torque value and a friction braking torque value.

The vehicle 12 utilizes regenerative braking as the primary braking source, and supplements with friction braking when there is insufficient available regenerative braking torque to satisfy the total brake torque requested by the driver. Regenerative braking recharges the main battery 32 and recovers much of the energy that would otherwise be lost as heat during friction braking. Therefore regenerative braking improves the overall efficiency or fuel economy of the vehicle as compared to vehicles that are only configured for friction braking.

The steering system includes the electric steering actuator 52 which assists mechanical steering. However, if electrical power to the electric steering actuator 52 were disrupted, then the mechanical connections within the steering system would engage and allow for mechanical (unassisted) steering.

The gear selection system includes a shifter for manually selecting a gear setting of the gearbox 22. The gear selection system may include a shift position sensor for providing shifter selection information (e.g., PRNDL) to the vehicle controller 14.

The navigation system 60 may include a navigation display, a global positioning system (GPS) unit, a navigation controller and inputs (all not shown) for receiving destination information or other data from a driver. These components may be unique to the navigation system 60 or shared with other systems. The navigation system 60 may also communicate distance and/or location information associated with the vehicle 12, its target destinations, or other relevant GPS waypoints.

Figure 2:
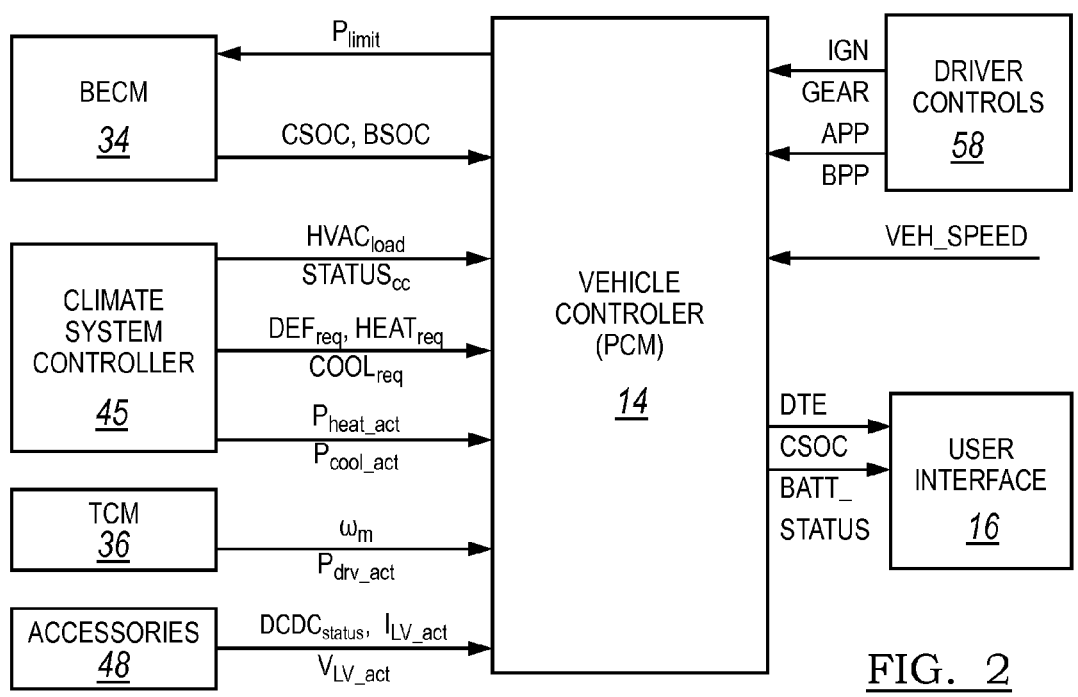
FIG. 2 is an enlarged schematic view of a portion of the vehicle system of FIG. 1, illustrating internal vehicle communication.

With reference to FIGS. 1 and 2, the vehicle controller 14 receives input that is indicative of present operating conditions of vehicle systems, and provides output to coordinate their function. Each input may be a signal transmitted directly between the vehicle controller 14 and the corresponding vehicle system, or indirectly as data over the CAN bus 38.

The BECM 34 provides input (BSOC, CSOC, $P_{act}$) to the vehicle controller 14 that represents the energy level of the main battery 32. The BECM 34 monitors battery conditions such as battery voltage, current, temperature and state of charge measured values. The BECM 34 also compares current battery conditions to historic data to evaluate battery life ("aging"), change in capacity over time, faults, and any predetermined limits. The BSOC input represents the battery state of charge, which is the amount of electric energy of the main battery 32 as a percentage from 0% (empty) to 100% (full). The CSOC input represents the customer state of charge, which is the amount of "available" electric energy of the main battery 32 as a percentage. The relationship between BSOC and CSOC is described in detail below with respect to FIG. 3. The $P_{act}$ input represents the total amount of actual power presently supplied by the main battery 32 to other vehicle components (e.g., motor 18, climate control system 40).

The vehicle controller 14 provides input ($P_{limit}$) to the BECM 34 that represents an allowable battery power limit. During low BSOC conditions the vehicle controller 14 may reduce the allowable battery power limit to conserve battery power and control vehicle shutdown.

The vehicle controller 14 receives input ($P_{heat\_act}$, $P_{cool\_act}$) that represents the actual electrical power usage by the climate control system 40 to heat and cool the vehicle 12. The $P_{heat\_act}$ input represents the actual electrical power provided to the ptc heater 42 to heat the vehicle. The $P_{cool\_act}$ input represents the actual electrical power provided to the HVAC compressor 44 to cool the vehicle 12. In other embodiments, the vehicle controller 14 may receive voltage and current measurements that correspond to electrical power.

The climate controller 45 provides input ($HVAC_{load}$, $STATUS_{cc}$, $HEAT_{req}$, $COOL_{req}$) to the vehicle controller 14 that represent vehicle temperature conditions and driver thermal requests. The $HVAC_{load}$ input represents the electrical load of the climate control system 40 based on temperature conditions inside the vehicle 12. The $HEAT_{req}$ input represents a driver request for heating, and the $COOL_{req}$ input represents a driver request for cooling. The $STATUS_{cc}$ input represents an on/off status of the climate control system 40. The $STATUS_{cc}$, $HEAT_{req}$ and $COOL_{req}$ inputs are each based on a position of an operator actuated switch, knob or dial, which are collectively referred to as thermal controls and illustrated in FIG. 11.

The climate control system 40 also includes a defrost feature where both the PTC heater 42 and HVAC compressor 44 are used to collectively melt ice and remove humidity from a front or rear window (not shown) of the vehicle 12. In one or more embodiments, the climate controller 45 also provides an input ($DEF_{req}$) to the vehicle controller 14 that represents a driver request for defrost. Additionally, in one or more embodiments, the $STATUS_{cc}$ input includes information regarding a defrost status (e.g., active or inactive).

The vehicle controller 14 receives input ($\omega_m$, $P_{drv\_act}$) that is indicative of motor 18 conditions. The $\omega_m$ input represents the output speed of the motor 18, and the $P_{drv\_act}$ input represents the actual electrical power provided to the motor 18 to generate drive torque for propelling the vehicle 12.

The vehicle controller receives input ($I_{LV\_act}$, $V_{LV\_act}$) that represents the actual power usage of the accessories 48. The vehicle 12 includes sensors (not shown) that measure the actual voltage and current that is provided by the main battery 32 to the LV battery 46. These sensors provide the $I_{LV\_act}$ and $V_{Lv\_act}$ inputs, which represent the actual current and the actual voltage provided to the LV battery 46, respectively. In other embodiments, the vehicle controller 14 receives an input signal corresponding to the actual power (not shown) that is provided to the LV battery 46. The vehicle controller also receives input ($DCDC_{status}$) that represents the status of the DC-DC converter 54. The $DCDC_{status}$ input includes information regarding which accessories 48 are enabled. For example, in one or more embodiments, the vehicle system 10 may disable certain accessories 48, or all accessories 48 by disconnecting electrical power to the DC-DC converter 54.

The vehicle controller 14 receives input (KEY, GEAR, APP, BPP) from the driver controls 58 that represents the current position of a number of vehicle systems. The KEY input represents a position of a key or vehicle state (e.g., off, run, accessories). The GEAR input represents the gear position or selection (e.g., PRNDL). The APP input represents the accelerator pedal position. The BPP input represents the brake pedal position. The vehicle controller 14 also receives an input (VEH_SPEED) that represents the vehicle speed.

The vehicle controller 14 evaluates the input and provides output (CSOC, DTE, BAT_STATUS) to the user interface 16 that represents battery information such as CSOC and an estimated vehicle travel range, or "distance to empty" (DTE). The user interface 16 may display a message, such as a limited operation message (FIGS. 14 and 15) in response to the BAT_STATUS.

Figure 3:
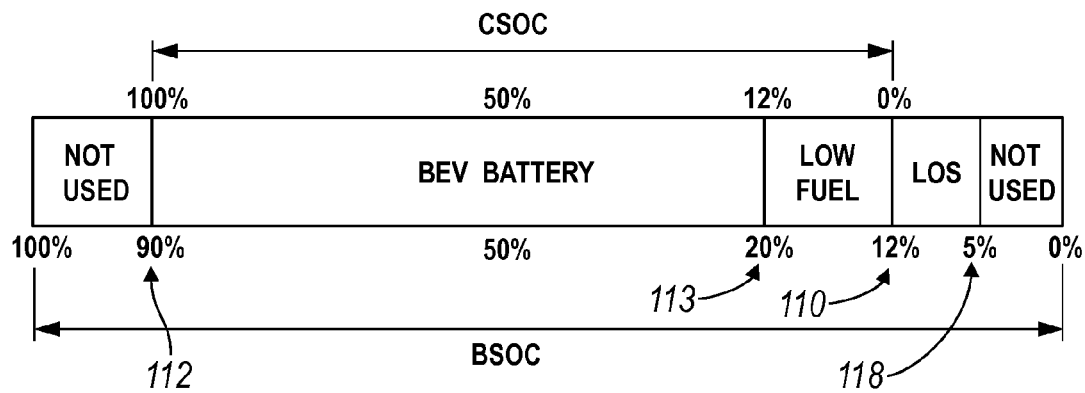
FIG. 3 is a diagram illustrating battery state of charge (BSOC) limits and customer state of charge (CSOC) limits of the vehicle system of FIG. 1.

FIG. 3 is a diagram illustrating the relationship between battery state of charge (BSOC) and customer state of charge (CSOC). BSOC represents the electric energy of the main battery 32 as a percentage from 0% (empty) to 100% (full). Generally, batteries may be damaged if they are overcharged or overly discharged. Therefore, the main battery 32 is maintained within a reduced operating range during normal operating conditions. In one or more embodiments the reduced operating range is between 12% BSOC and 90% BSOC. The 12% BSOC value corresponds to a discharge limit and is referenced by numeral 110. In other embodiments, the discharge limit is between 7% and 15% BSOC. The 90% BSOC value corresponds to a charging limit and is referenced by numeral 112. The reduced operating range includes a low charge limit and is referenced by numeral 113. The low charge limit is between 25% and 15% BSOC, according to one or more embodiments. The low charge limit is 20% BSOC in the illustrated embodiment.

The battery energy level information is conveyed to the driver visually by the user interface 16. The driver uses this energy level information much like a fuel gage on a conventional vehicle. However, the BSOC values are not displayed, because the reduced operation range may confuse a driver. For example, a driver might think they can drive the vehicle 12 until 0% BSOC. Therefore, the vehicle system 10 calculates a customer state of charge (CSOC) which corresponds to the operating range of the BSOC. According to the illustrated embodiment, a CSOC value of 0% corresponds to the discharge limit 110 (12% BSOC), a CSOC value of 100% corresponds to the charging limit 112 (90% BSOC), and a CSOC value of 12% corresponds to the low charge limit 113 (20% BSOC).

Figure 4:
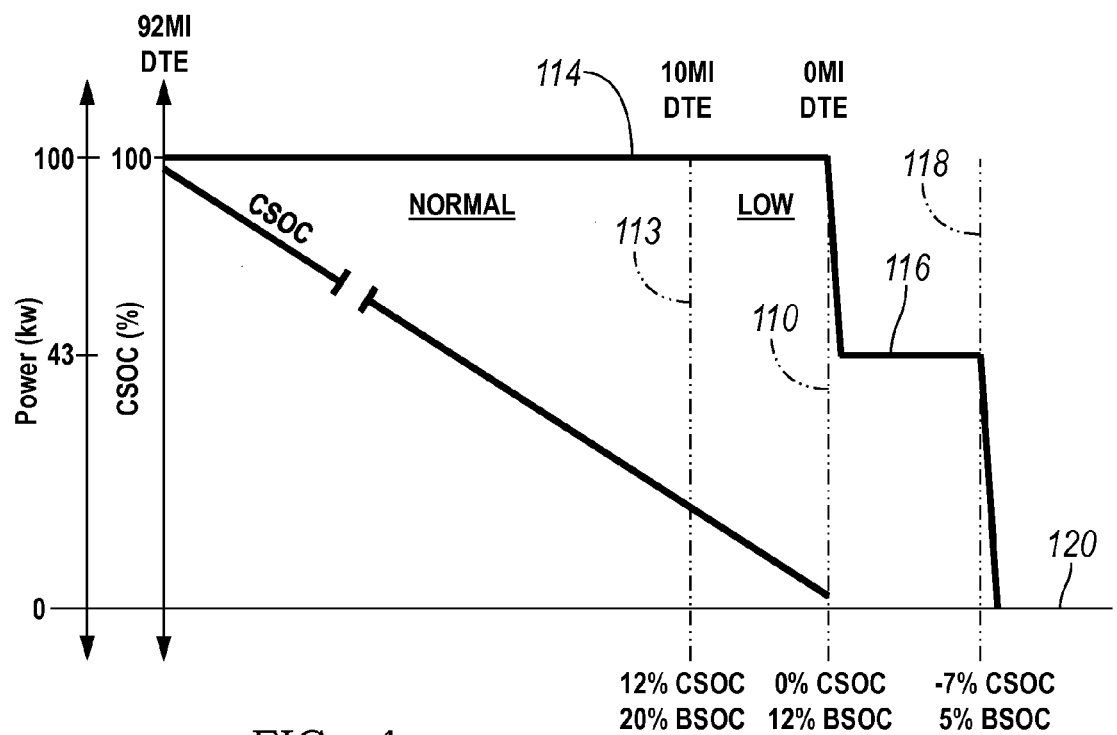
FIG. 4 is a graph illustrating BSOC limits and battery power limits of the vehicle system of FIG. 1.

Referring to FIGS. 3 and 4, the battery 32 may be damaged if operated below the discharge limit 110 at high battery power levels. Therefore the vehicle system 10 warns the driver before the BSOC reaches the discharge limit 110. Similar to the illumination of a "low fuel" inidicia on a traditional vehicle, the vehicle system 10 displays a warning message (FIG. 13) when the BSOC decreases below the low charge limit 113. Additionally, the battery 32 may operate below the discharge limit 110 at a reduced battery power level for a short distance (e.g., five to seven miles) without damaging the battery 32.

To extend the overall vehicle travel range, the vehicle system 10 initiates a limited operating strategy (LOS) once the BSOC reaches the discharge limit 110. During LOS, the vehicle system 10 reduces battery power from a full power limit, which is referenced by numeral 114, to an intermediate power limit, which is referenced by numeral 116. The full power limit is approximately 100 kW. The intermediate power limit is between 50 kW and 60 kW, according to one or more embodiment. The intermediate power limit is 43 kW in the illustrated embodiment. The intermediate power limit is based on estimated power to maintain an acceptable vehicle speed in city traffic according to one embodiment.

A maximum discharge limit is referenced by numeral 118. The battery 32 may be damaged if operated below the maximum discharge limit 118. Therefore the vehicle system 10 initiates a controlled shutdown of the vehicle 12 when the BSOC is less than the maximum discharge limit 118. The maximum discharge limit is between 6% and 3% BSOC, according to one or more embodiment. The maximum discharge limit is 5% BSOC in the illustrated embodiment.

Figure 5:
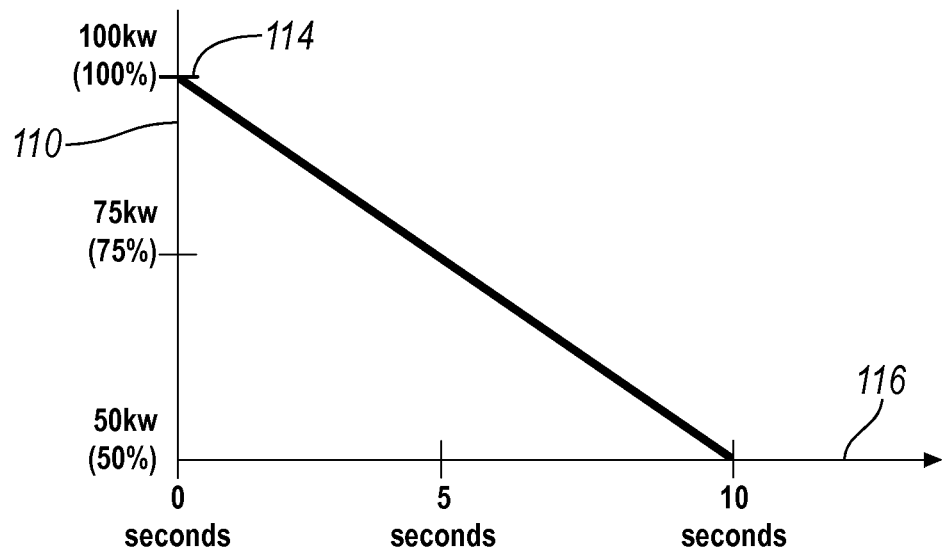
FIG. 5 is an enlarged portion of the graph of FIG. 4.

With reference to FIGS. 4 and 5 the vehicle system 10 gradually reduces the power limit at a ramp or slew rate. The vehicle system 10 reduces the power limit at a ramp rate between 3 kW/s and 10 kW/s according to one or more embodiments. In the embodiment illustrated in FIG. 5, the vehicle system 10 reduces the battery power limit from full power limit 114 to intermediate power limit 116 at a ramp rate of 5 KW/s. The vehicle system 10 adjusts the power limit at a ramp rate, rather than an abrupt step change, to provide time for the driver to adjust to the limited performance of the vehicle 12. However when the BSOC reaches the discharge limit 110, if the vehicle system 10 determines that the main battery 32 is presently supplying less power than the intermediate power limit 116, then the vehicle system 10 may adjust the power limit using a step change. Referring to FIG. 4, the vehicle system 10 also reduces the battery power limit from the intermediate power limit 116 to shutdown (e.g., 0 KW), which is referenced by numeral 120, at a ramp rate of approximately 5 KW/s.

Figure 6:
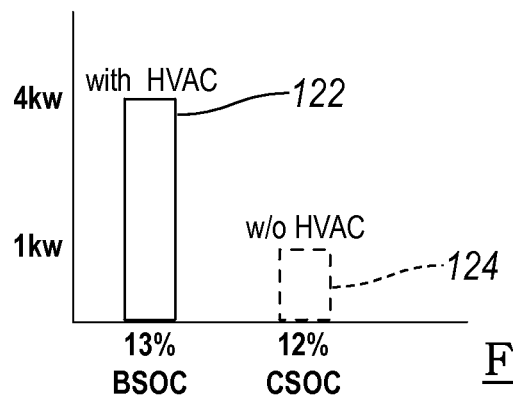
FIG. 6 is a graph illustrating power consumption of auxiliary loads of the vehicle system of FIG. 1.
Figure 7:
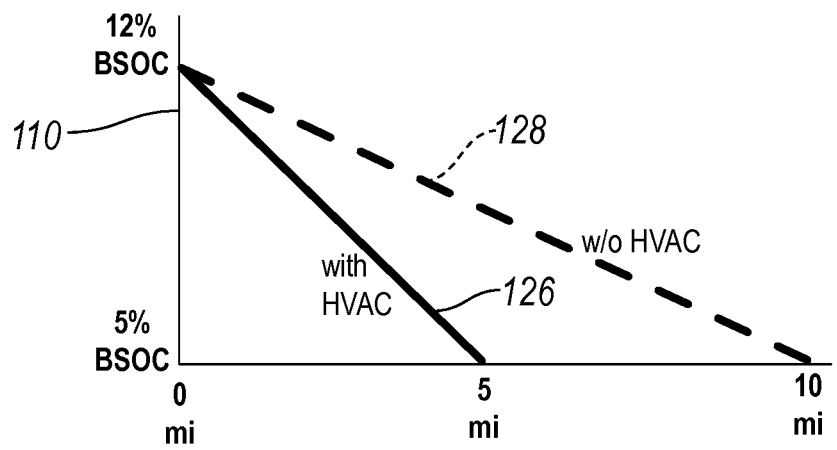
FIG. 7 is a graph illustrating a vehicle travel range (DTE) corresponding to the power consumption of the auxiliary loads of FIG. 6.

FIGS. 6 and 7 illustrate an example of how the vehicle system 10 may conserve battery energy and extend travel range, by disabling the climate control system 40 during LOS. The vehicle system 10 selectively reduces, or "sheds", electrical power usage once the BSOC is less than the discharge limit 110 (during LOS). The auxiliary loads of the vehicle 12 include the climate control system 40 and the DC-DC converter 54 (shown in FIG. 1). The DC-DC converter 54 provides power to the accessories 48. As shown in FIG. 6, the auxiliary loads consume approximately 4 kW of power during LOS, which is represented by numeral 122. However, by disabling the climate control system 40 during LOS, the remaining auxiliary loads (DC-DC converter 54) only consumes approximately 1 kW of power, which is represented by numeral 124. Therefore by disabling the climate control system 40 during LOS, the vehicle system 10 may conserve approximately 3 kW of power.

FIG. 7 illustrates the impact of this conserved power on vehicle travel range. With the climate control system 40 enabled, the vehicle 12 travels approximately 5 miles during LOS, as referenced by line 126. However, by disabling the climate control system 40, the conserved energy allows the vehicle 12 to travel approximately 10 miles during LOS, as referenced by line 128. Therefore, by disabling the climate control system 40 during LOS, the vehicle system 10 enables the vehicle 12 to travel approximately five additional miles, so that the driver can drive the vehicle 12 to the nearest charging station.

Figure 8:
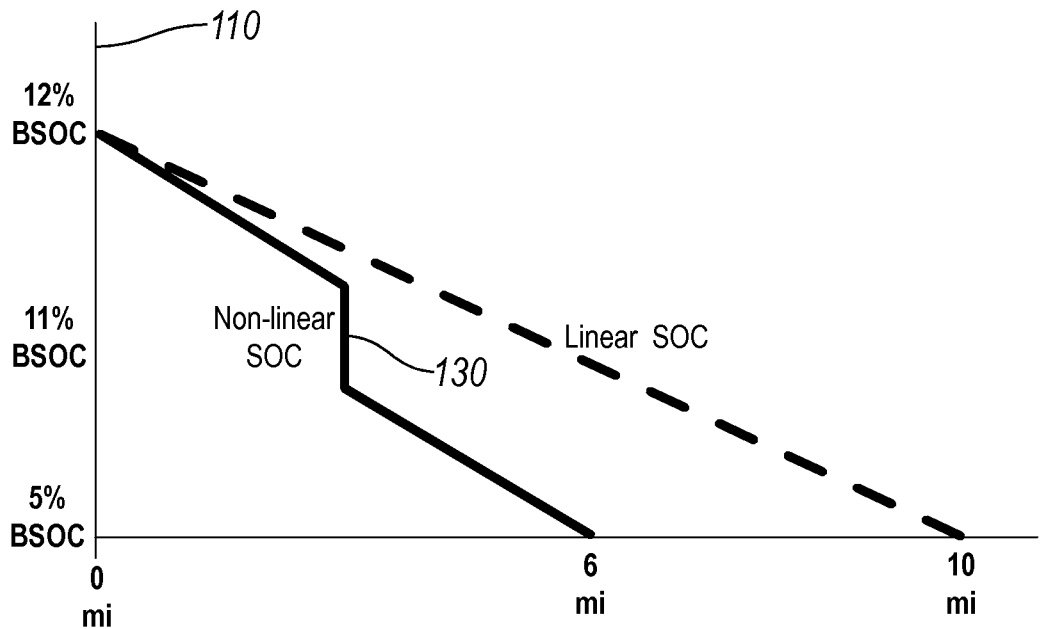
FIG. 8 is a graph illustrating a state of charge recalibration adjustment.
Figure 9:
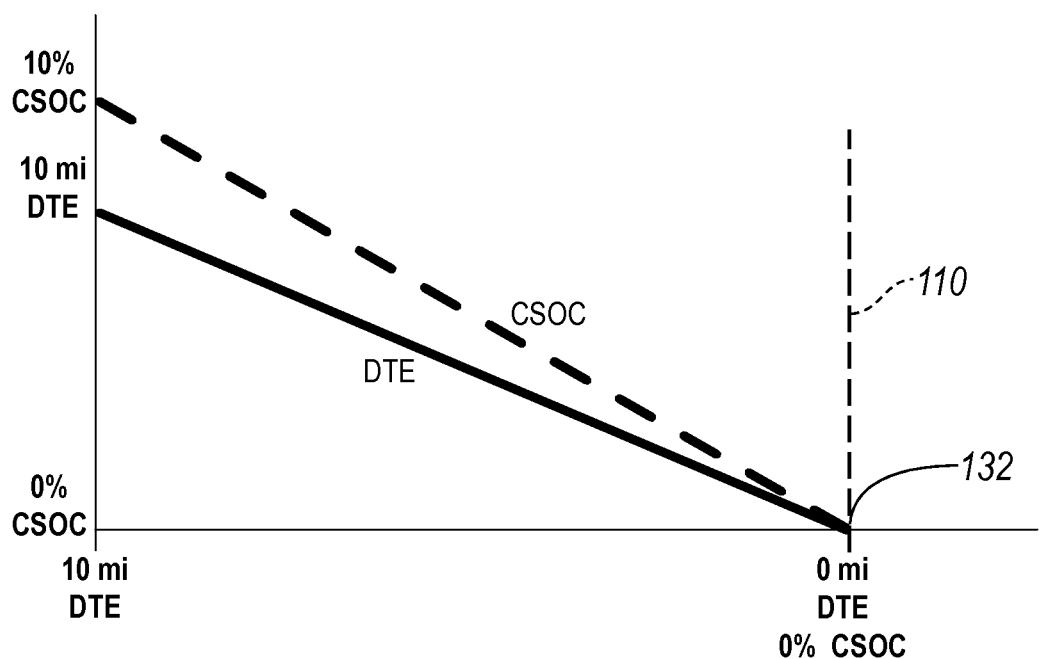
FIG. 9 is a graph illustrating a relationship between DTE and CSOC.

With reference to FIGS. 8 and 9, the vehicle system 10 minimizes variation in the battery energy level values that are displayed to the driver. Variation or rapid changes in the CSOC, DTE or other pictorial display (shown in FIGS. 12-15) may be distracting to the driver, especially at low battery conditions. Therefore the vehicle system 10 minimizes such variation by overriding input and weighting calculation adjustments. For example, as mentioned above with reference to FIG. 1, the BECM 34 takes many variables into consideration to determine the BSOC. Sometimes, the BECM recalculates BSOC, and attempts to re-calibrate the battery state of charge value with an abrupt step change, as indicated by numeral 130. Such SOC adjustments change the CSOC and DTE values, and results in rapid changes on the interface 16. To avoid these rapid changes, the vehicle system 10 overrides the SOC re-calibration during LOS, by not recalculating CSOC and DTE in response to such adjustments. However, in one or more embodiments, the vehicle system 10 may reduce the battery power limit to a low limit of approximately 10 kW (not shown) to prevent any battery 32 damage due to overriding the SOC recalibrations.

Referring to FIG. 9, although DTE and CSOC are related, they are calculated differently. However, a driver may expect that that distance to empty (DTE) is equal to zero when the state of charge of battery (CSOC) is also equal to zero. Therefore DTE is calculated such that it is weighted more heavily on the CSOC value at low CSOC values than at high CSOC values. Such a calculation of vehicle travel range is disclosed in U.S. provisional application No. 61/578,839 to Donald et al. and is incorporated by reference in its entirety herein. By calculating DTE in this manner, the DTE and CSOC values align at the discharge limit 110 as referenced by numeral 132.

Figure 10:
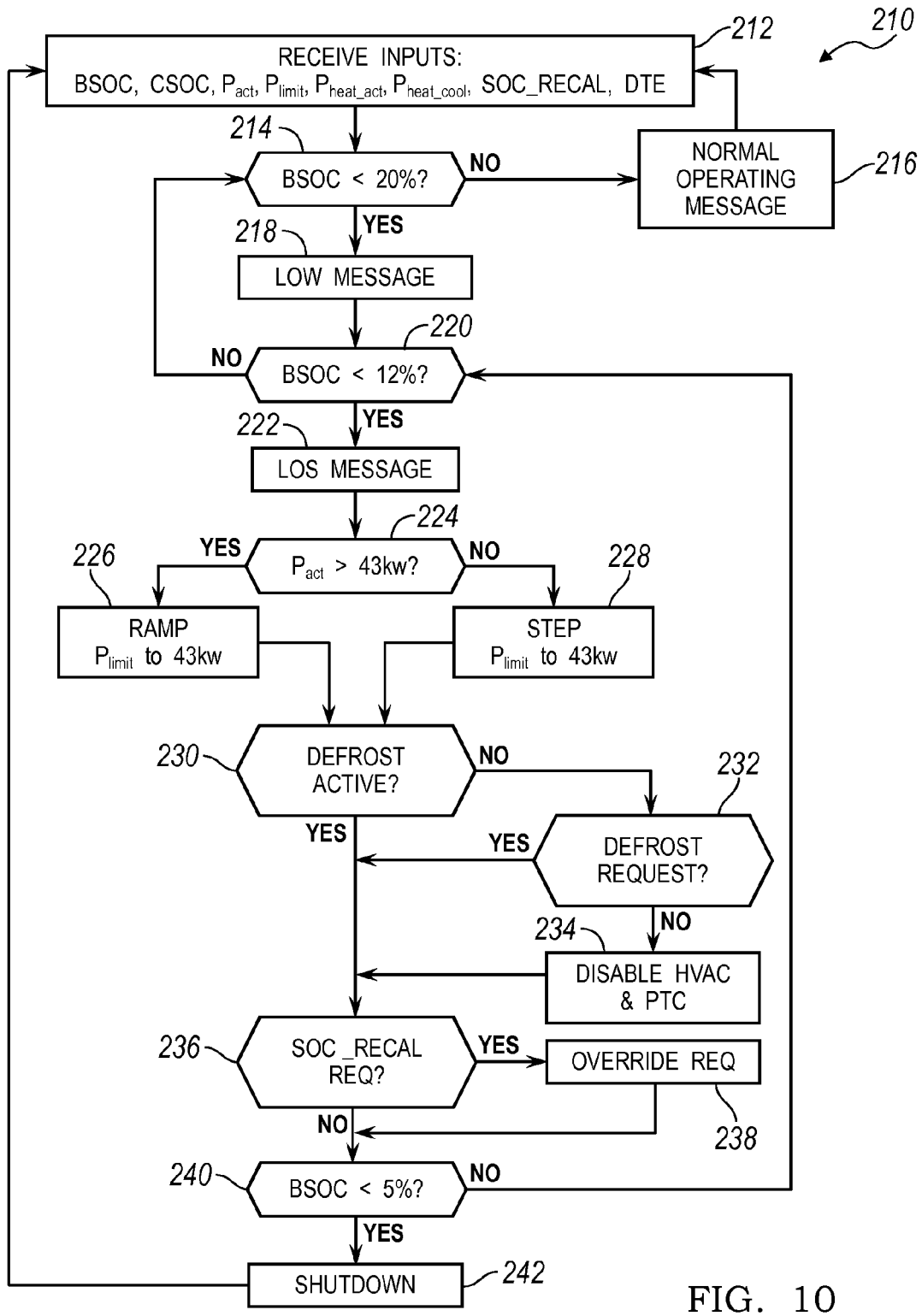
FIG. 10 is a flow chart illustrating a method for limiting operation of an electric vehicle according to one or more embodiments.

With reference to FIG. 10 a method for limiting operation of the electric vehicle 12 of FIG. 1 is illustrated according to one or more embodiments and generally referenced by numeral 210. The method 210 is implemented using software code contained within the vehicle controller 14 according to one or more embodiments. In operation 212, the vehicle controller 14 receives input including the battery state of charge (BSOC), the customer state of charge (CSOC), the power limit ($P_{limit}$), the total actual battery power ($P_{act}$), the actual electrical power provided to the ptc heater 42 ($P_{heat\_act}$), the actual electrical power provided to the HVAC compressor 44 ($P_{cool\_act}$), the state of charge recalibration request (SOC_RECAL) and the vehicle travel range (DTE).

In operation 214 the BSOC value is compared to the low charge limit (20% BSOC). If the BSOC value is greater than the low charge limit, then the vehicle controller 14 applies a normal battery operating strategy and proceeds to operation 216 to display a normal operating message (e.g., the message shown in FIG. 12). If the determination at operation 214 is positive, then the vehicle controller 14 applies a low charge strategy and proceeds to operation 218 to display a low charge message (e.g. the message shown in FIG. 13).

The BSOC value is compared to the discharge limit (12% BSOC) in operation 220. If the BSOC value is greater than the discharge limit, then the vehicle controller 14 returns to operation 214. If the determination at 220 is positive, the vehicle controller 14 proceeds to operation 222 and displays a limited operating strategy (LOS) message (e.g., the message shown in FIG. 14 or FIG. 15).

In operation 224 the total actual battery power ($P_{act}$) is compared to the intermediate power limit (43 kW). If $P_{act}$ is greater than the intermediate power limit, then the vehicle controller reduces the battery power limit to the intermediate power limit at a controlled ramp rate in operation 226. However, if the determination at operation 224 is negative, then the vehicle controller 14 proceeds to operation 228 and reduces the battery power limit to the intermediate power limit at a step rate.

The vehicle controller determines if defrost is active in operation 230. In one embodiment the vehicle controller 14 analyzes the actual electrical power provided to the ptc heater 42 ($P_{heat\_act}$) and the actual electrical power provided to the HVAC compressor 44 ($P_{cool\_act}$), and if both are positive then the vehicle controller 14 determines that defrost is active. In another embodiment, the vehicle controller 14 receives an input indicative of a defrost status (e.g., active or inactive). If the determination at operation 230 is negative, then the vehicle controller 14 proceeds to operation 232 to determine if a request for defrost ($DEF_{req}$) has been received. If the determination at operation 232 is negative, then the vehicle controller 14 proceeds to operation 234 and disables the climate control system 40. If the determination in operation 230 or 232 is positive, then the vehicle controller 14 proceeds to operation 236. Defrost improves driver visibility, and therefore the vehicle system 10 treats defrost functionality as an override to disabling the climate control system 40.

In operation 236 the vehicle controller 14 determines if a SOC reset request has been made. If the determination at operation 236 is positive, then the vehicle controller 14 proceeds to operation 238 and overrides the request.

In operation 240 the BSOC value is compared to the maximum discharge limit (5% BSOC). If the BSOC value is greater than the maximum discharge limit, then the vehicle controller 14 returns to operation 220. If the determination at operation 240 is positive, then the vehicle controller 14 proceeds to operation 242 and applies a shutdown operating strategy With reference to FIG. 11, the user interface 16 is located within an instrument cluster 310 according to one or more embodiments. In other embodiments, the user interface may be located in a central portion of a dashboard ("centerstack"). The user interface 16 may be a liquid crystal display (LCD), a plasma display, an organic light emitting display (OLED), or any other suitable display. The user interface 16 may include a touch screen or one or more buttons (not shown), including hard keys or soft keys, located adjacent the user interface 16 for effectuating driver input.

Figure 12:
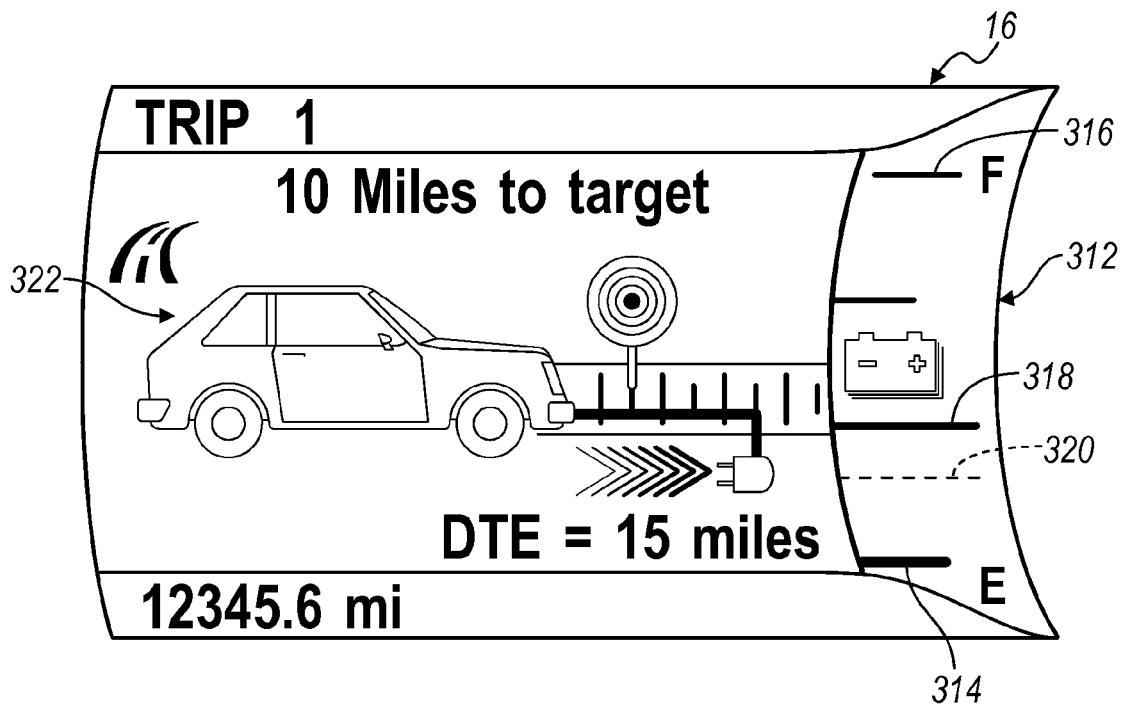
FIG. 12 is an enlarged view of the user interface of FIG. 11, illustrating a normal operating message.

With reference to FIG. 12, the user interface 16 conveys information, such as DTE and the customer state of charge (CSOC) during normal operating conditions. In the illustrated embodiment, the CSOC is conveyed pictorially as a gage 312 having markings or horizontal lines that represent CSOC values. The discharge limit (0% CSOC) is represented by the letter "E" for "Empty" and by a horizontal line, referenced by numeral 314. The charging limit (100% CSOC) is represented by the letter "F" for "Full" and by a horizontal line referenced by numeral 316. The present energy level of the battery 32 is represented by a horizontal line 318, which is above the discharge limit 314. The present energy level 318 is approximately 22% BSOC which corresponds to a DTE of 15 miles, in the illustrated embodiment. Additionally, the low charge limit (20% BSOC) is shown on the gage according to one or more embodiments and referenced by numeral 320. The present energy level 318 is greater than the low charge limit 320. As mentioned above with respect to FIG. 10, the vehicle controller 14 provides a normal operation message to the interface 16 when the BSOC is above the low charge limit. This message may be conveyed to the driver both pictorially and using text, and is generally referenced by numeral 322.

Figure 13:
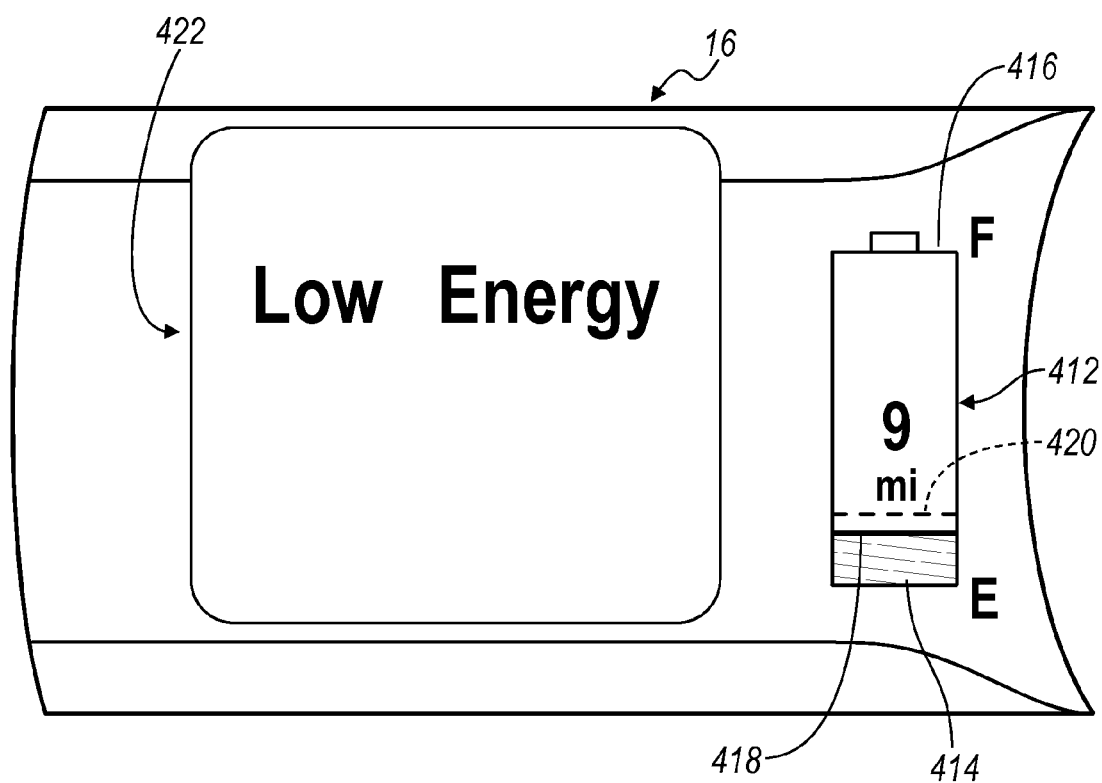
FIG. 13 is another enlarged view of the user interface of FIG. 11, illustrating a low charge message.

With reference to FIG. 13, the user interface 16 conveys information, such as DTE, CSOC and a warning message during low charge conditions. In the illustrated embodiment, the CSOC is conveyed pictorially as a battery element 412 having a housing and a fluid level that represents CSOC values. The discharge limit (0% CSOC) is represented by a base 414 of the battery element 412 and the letter "E" for "Empty". The charging limit (100% CSOC) is represented by a top 416 of the battery element 412 and the letter "F" for "Full". The present energy level of the battery 32 is represented by a fluid level line 418, which is above the discharge limit 414. The present energy level 418 is approximately 15% BSOC which corresponds to a DTE of 9 miles, in the illustrated embodiment. Additionally, the low charge limit (20% BSOC) is shown on the gage according to one or more embodiments and referenced by numeral 420. The present energy level 418 is less than the low charge limit 420. As mentioned above with respect to FIG. 10, the vehicle controller 14 provides a low charge message to the interface 16 when the BSOC is below the low charge limit. This message may be conveyed to the driver both pictorially and using text, and is generally referenced by numeral 422.

Figure 14:
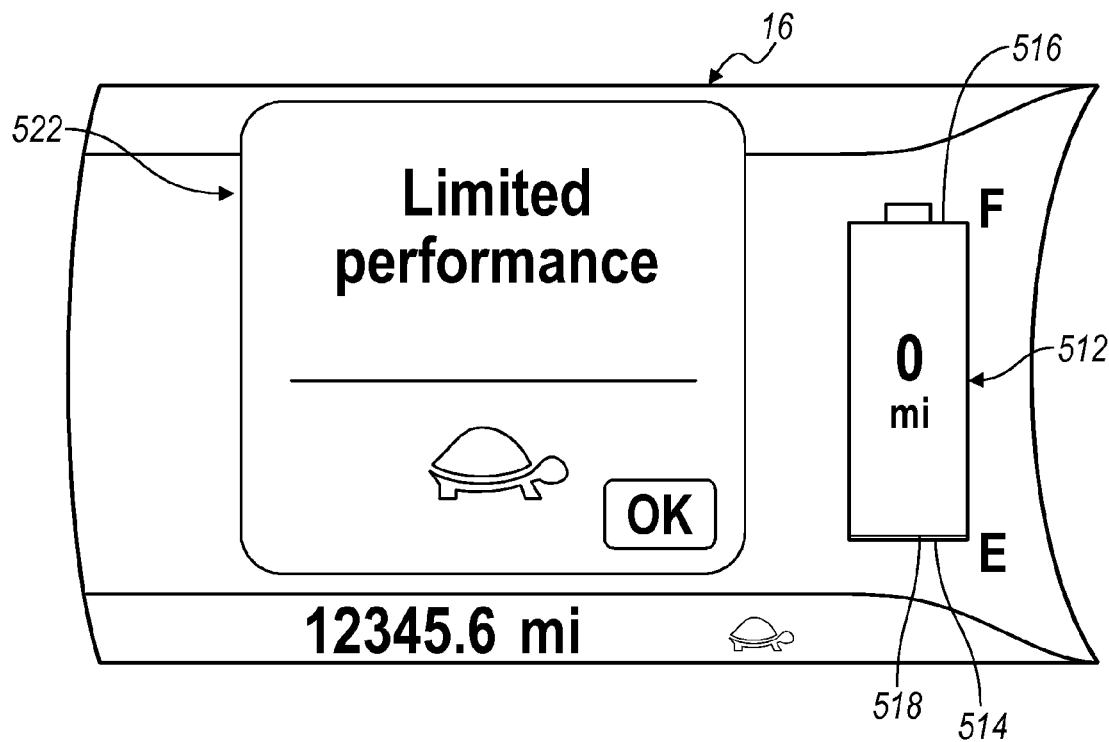
FIG. 14 is yet another enlarged view of the user interface of FIG. 11, illustrating a limited operating strategy message.

With reference to FIG. 14, the user interface 16 conveys information, such as DTE, CSOC and a warning message during limited operating conditions. In the illustrated embodiment, the CSOC is conveyed pictorially as a battery element 512 having a housing and a fluid level that represents CSOC values. The discharge limit (0% CSOC) is represented by a base 514 of the battery element 512 and the letter "E" for "Empty". The charging limit (100% CSOC) is represented by a top 516 of the battery element 412 and the letter "F" for "Full". The present energy level of the battery 32 is represented by a fluid level line 518, which is at the discharge limit 514. The present energy level 518 is approximately 10% BSOC which corresponds to a negative DTE, which is represented by "0 miles", in the illustrated embodiment. Although the present energy level 518 (10% BSOC) is less than the discharge limit 514 (12% BSOC), this difference is not illustrated on the battery element 512. As mentioned above with respect to FIG. 10, the vehicle controller 14 provides a limited operating message to the interface 16 when the BSOC is below the discharge limit. This message may be conveyed to the driver both pictorially (e.g., as a turtle) and using text (e.g., "Limited Performance"), and is generally referenced by numeral 522.

Figure 15:
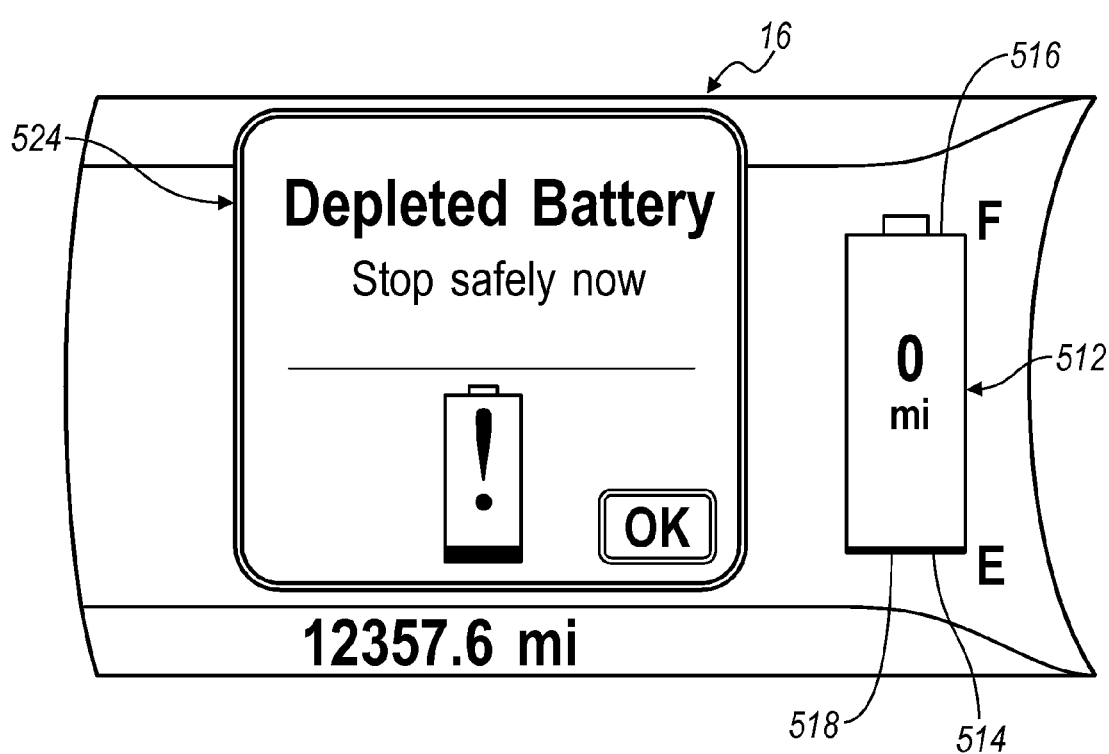
FIG. 15 is still yet another enlarged view of the user interface of FIG. 11, illustrating another limited operating strategy message.

With reference to FIG. 15, the vehicle system 10 displays different warning messages during limited operating conditions based on the present BSOC value, according to one or more embodiments. For example, the present energy level 518 of the embodiment depicted in FIG. 15 is approximately 6% BSOC which again is less than the discharge limit 514 (12% BSOC). Since the present energy level 518 is at the low end of the LOS range (approximately 12% to 5% BSOC) the vehicle system may provide a different limited operating message to the interface 16, as compared to the message 522 shown in FIG. 14. This second message may be conveyed to the driver both pictorially as an empty battery and using text (e.g., "Depleted Battery"), and is generally referenced by numeral 524.

As such the vehicle system 10 provides advantages by allowing limited operation of the vehicle 12 below the discharge limit. The vehicle system 10 limits operation of the vehicle 12 once the BSOC is less than the discharge limit by disabling the climate control system 40 and reducing a battery power limit to an intermediate limit, to extend a travel range (DTE) of the vehicle 12.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
  a climate control system;
  a motor configured to provide drive torque;
  a battery for supplying power to the climate control system and the motor; and
  a controller configured to:
  receive input indicative of a battery state of charge (BSOC) and a state of charge (SOC) recalibration request, and
  disable the climate control system, override the request and reduce the power available to the motor, when the BSOC is less than a discharge limit.

2. The vehicle of claim 1 wherein the climate control system further comprises a heater and an HVAC compressor, and wherein the at least one controller is further configured to:
  receive input indicative of power provided to the heater and power provided to the HVAC compressor; and
  prevent disabling of the climate control system when power is provided to both the heater and the HVAC compressor concurrently.

3. The vehicle of claim 1 wherein the discharge limit is between 7% BSOC and 15% BSOC.

4. The vehicle of claim 1 wherein the at least one controller is further configured to reduce a battery power limit to an intermediate power limit when the BSOC is less than the discharge limit, and wherein the intermediate power limit is between 8 kW and 50 kW.

5. The vehicle of claim 4 wherein the intermediate power limit is between 40 kW and 45 kW.

6. A vehicle system comprising:
  a battery configured to supply power to a motor and a climate control system; and
  a controller configured to:
  receive input indicative of a battery state of charge (BSOC) and a state of charge (SOC) recalibration request, and
  disable the climate control system, override the request and reduce the power available to the motor, when the BSOC is less than a discharge limit and greater than a maximum discharge limit.

7. The vehicle system of claim 6 wherein the at least one controller is further configured to:
  receive input indicative of a total power supplied by the battery; and reduce the power available to the motor at a controlled ramp rate when the total power is greater than an intermediate power limit.

8. The vehicle system of claim 6 wherein the at least one controller is further configured to:
receive input indicative of a total power supplied by the battery; and
reduce the power available to the motor at a step rate when the total power is less than an intermediate power limit.

9. The vehicle system of claim 6 wherein the at least one controller is further configured to:
receive input indicative of a defrost status; and
prevent disabling of the climate control system when defrost is active.

10. The vehicle system of claim 6 wherein the at least one controller is further configured to:
receive input indicative of a defrost request; and
upon disabling the climate control system, enabling the climate control system in response to the defrost request.

11. The vehicle system of claim 6 wherein the at least one controller is further configured to:
reduce a battery power limit to an intermediate power limit between 8 kW and 12 kW in response to the SOC recalibration request.

12. The vehicle system of claim 6 wherein the maximum discharge limit is between 3% BSOC and 7% BSOC.

13. A method for limiting operation of an electric vehicle, the method comprising:
supplying battery power to a motor for vehicle propulsion;
receiving input indicative of a battery state of charge (BSOC), a state of charge (SOC) recalibration request and a defrost status;
reducing the battery power available to the motor and overriding the request when the BSOC is less than a discharge limit; and
disabling a climate control system when the BSOC is less than the discharge limit and the defrost status is inactive.

14. The method of claim 13 further comprising:
receiving input indicative of a total power supplied by the battery; and
reducing the battery power available to the motor at a controlled ramp rate when the total power is greater than an intermediate power limit.

15. The method of claim 13 further comprising:
receiving input indicative of a total power supplied by the battery; and
reducing the battery power available to the motor at a step rate when the total power is less than an intermediate power limit.

16. The method of claim 13 further comprising:
displaying a limited operation message when the BSOC is less than the discharge limit.

17. The method of claim 13 wherein the discharge limit is between 7% BSOC and 15% BSOC.

18. The method of claim 14 wherein the intermediate power limit is between and 40 kW and 50 kW.

* * * * *